ARTICLE HANDLING AND TREATING APPARATUS

Filed Aug. 2, 1968 3 Sheets-Sheet 1

INVENTORS:
RODNEY K. CALVERT
& ALTON J. FISHBACK
BY Walter M. Rodgers
ATTORNEY

ARTICLE HANDLING AND TREATING APPARATUS

Filed Aug. 2, 1968 3 Sheets-Sheet 2

INVENTORS
RODNEY K. CALVERT
& ALTON J. FISHBACK
BY Walter M. Rodgers
ATTORNEY

ARTICLE HANDLING AND TREATING APPARATUS

Filed Aug. 2, 1968 3 Sheets-Sheet 3

INVENTORS
RODNEY K. CALVERT
& ALTON J. FISHBACK
BY Walter M. Rodgers
ATTORNEY

United States Patent Office 3,495,810
Patented Feb. 17, 1970

3,495,810

ARTICLE HANDLING AND TREATING APPARATUS

Rodney K. Calvert, Dunwoody, and Alton J. Fishback, Austell, Ga., assignors to The Mead Corporation, a corporation of Ohio Filed Aug. 2, 1968, Ser. No. 749,817
Int. Cl. F27b *9/24;* F27d *3/12*
U.S. Cl. 263—8 8 Claims

ABSTRACT OF THE DISCLOSURE

Apparatus for heat treating a plurality of articles of manufacture comprises a pair of spaced apart complementary coaxially disposed base plates interconnected about their peripheries with a plurality of support elements arranged parallel to each other and skewed at an angle to the axis between the base plates. A pair of complementary coincidental conveyor belts are trained about the support elements and the articles to be treated are interposed therebetween so that the belt and articles follow a spiral path about the support elements in a plurality of turns. A source of heat is disposed adjacent the base plates, conveyor means and support elements and the entire structure is mounted within a housing. Tension control means is provided for regulating tension of the conveyor means.

Articles such as paper containers are formed from paperboard which is folded and glued to form a completed article. In order to facilitate drying of the glue, it is desirable to apply heat thereto. Since an application of heat requires an interval of time in order to be effective and for the purpose of saving space, it is desirable to provide a path of travel for the articles during the period of heat application which occupies a minimum of space.

According to this invention a relatively long path of travel for an endless conveyor is provided by arranging a plurality of support elements about the peripheries of spaced support plates and the conveyor is trained thereabout in spiral fashion for a plurality of turns, the apparatus being disposed within a housing. During travel of the conveyor and articles heat is applied thereto and thereafter the articles are discharged from the apparatus.

Figure 1:
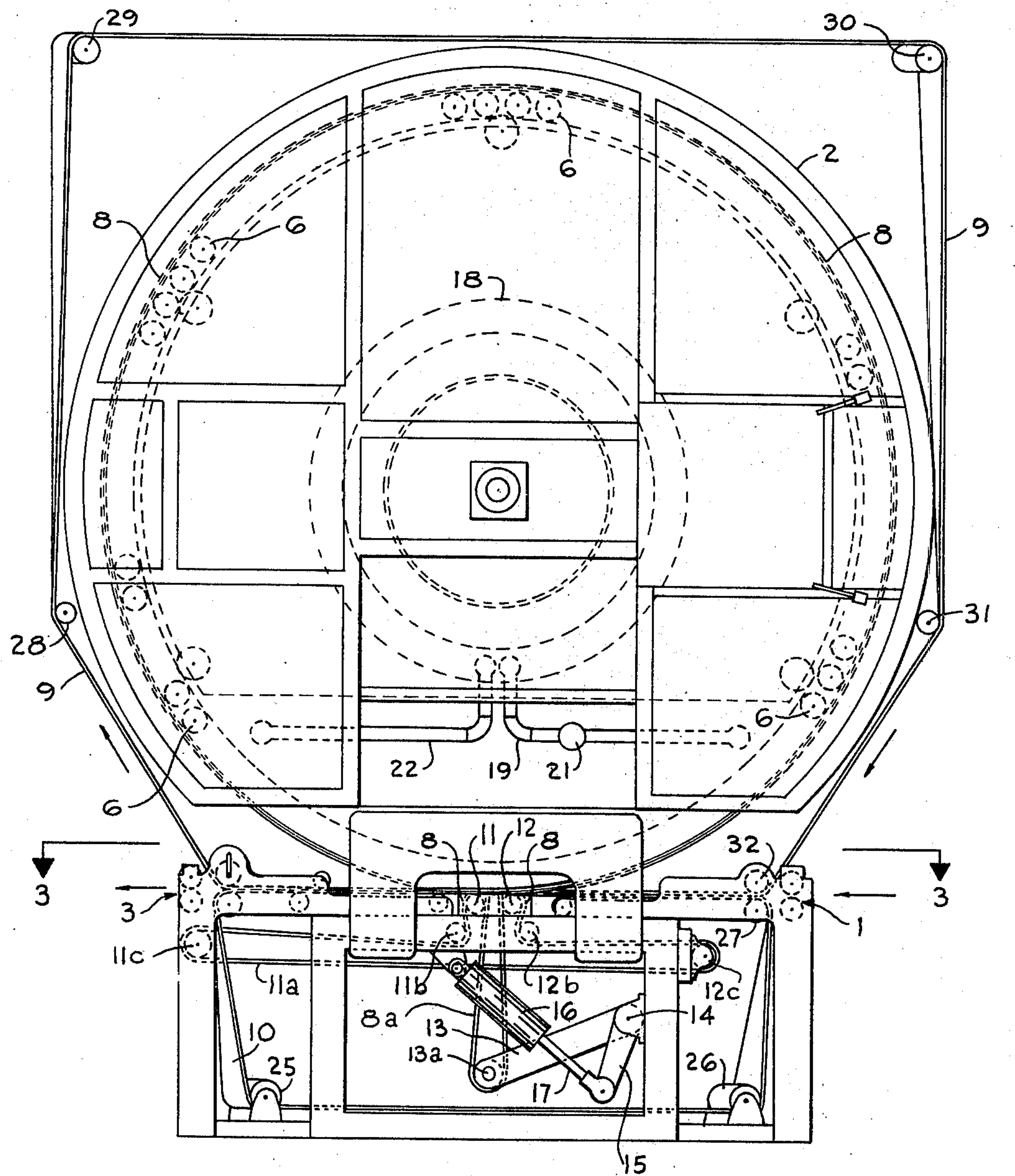
Figure 2:
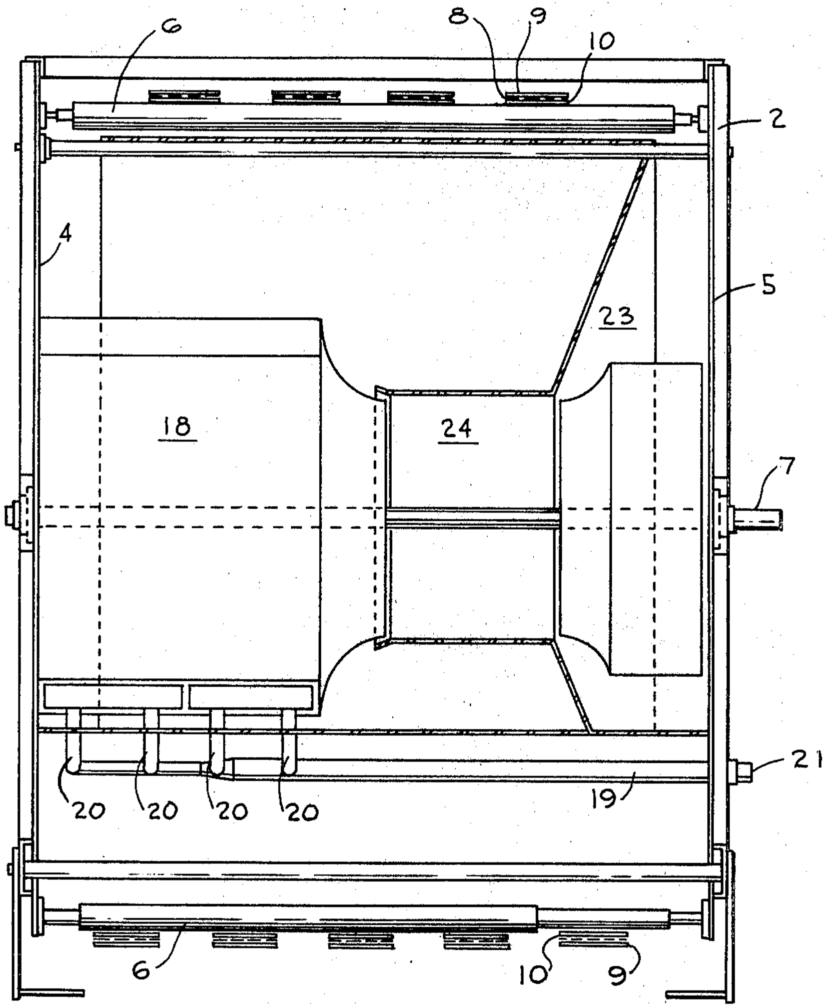

For a better understanding of the invention reference may be had to the following detailed description taken in conjunction with the accompanying drawings in which FIG. 1 is an end view of apparatus constructed according to the invention; FIG. 2 is a partial side view taken from the right side of the apparatus depicted in FIG. 1 but with the conveyor belt supporting base structure and tension means and the like removed from clarity; and in which FIG. 3 is a plan view taken along the line designated 3—3 in FIG. 1.

In FIG. 1, articles to be treated are introduced from a conveyor belt not shown which leads from a conventional glue machine into the infeed mechanism comprising power driven receiving rollers generally designated by the numeral 1 and proceed about the periphery of the structure disposed within housing 2 and are discharged from the apparatus through the outfeed mechanism comprising power driven roller system generally desginated by the numeral 3. During the passage of the articles through the apparatus, an application of heat is made thereto sufficient to effect quick and adequate drying of the glue.

While glue when applied to ordinary paperboard ordinarily dries rather rapidly, glue does not dry sufficiently when paperboard is given a water repellant treatment and while this invention is not limited thereto it is particularly applicable to the gluing of articles made of paperboard the surface of which has been treated with a water repellant substance.

Figure 3:
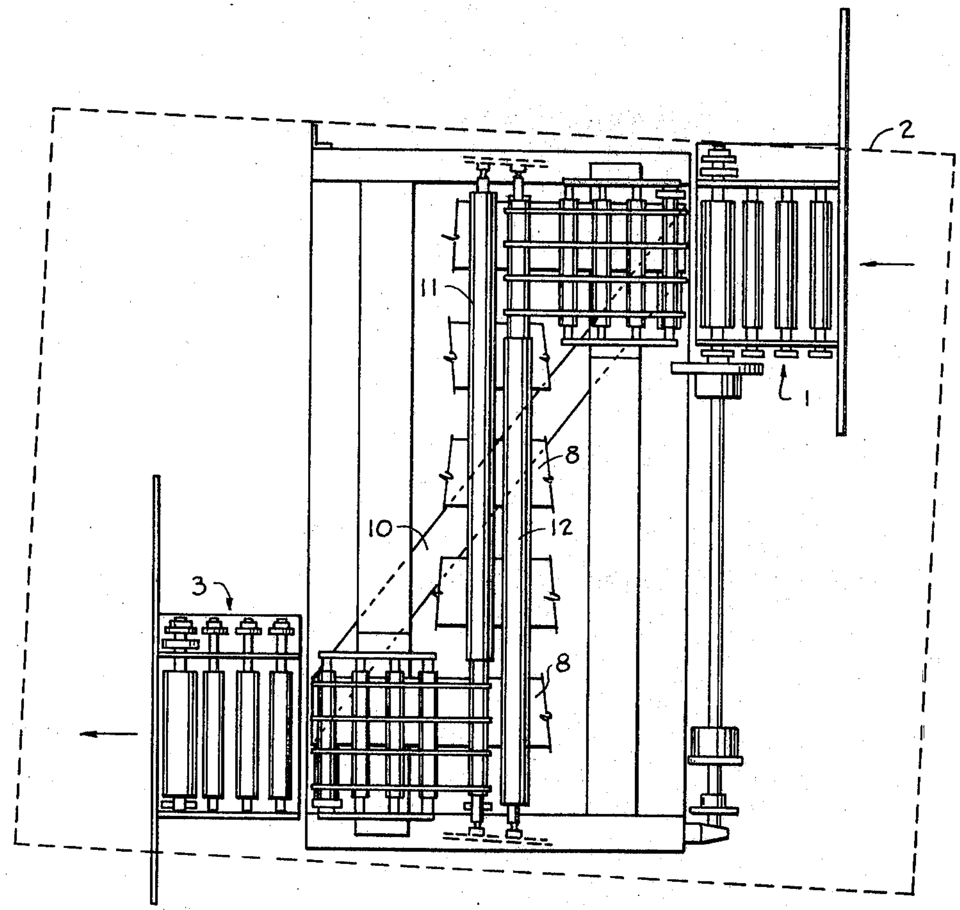

From FIG. 3 it is apparent that the entry rollers 1 are spaced axially away from the outlet rollers 3 and that the path of the articles throughout the housing 2 is a spiral path comprising a number of turns.

As is best shown in FIG. 2, a pair of base plates 4 and 5 are fixed in position within the housing structure 2 and a plurality of support elements 6 are rotatably mounted at their ends to the base plates 4 and 5. It is apparent that base plates 4 and 5 are of a complementary construction and that their centers are coaxially disposed about the axis element 7. From FIGS. 2 and 3 it is apparent that the base plates 4 and 5 are angularly displaced slightly relative to each other after the support elements 6 are mounted thereon so as to impart a slight angular skewed relationship between the support elements 6 and the axis 7 of the base plates 4 and 5. In this manner, endless means 8 is wound in a spiral relationship about the support elements 6 and forms a plurality of turns thereabout so that the path of travel of endless means 8 is significantly long although the total space occupied by the apparatus of the invention as depicted in the drawing is relatively small.

While it is possible to construct the endless means 8 in the form of a single belt trained about the support elements 6, and to interpose articles to be heat treated between the endless element 8 and the support elements 6, it is preferable to use a pair of belts designated by the numerals 9 and 10 and to arrange these belts in face contacing coincidental relationship. When the belts are arranged as indicated in FIG. 2 by the numerals 9 and 10, articles to be heat treated conveniently may be interposed therebetween in aligned relationship.

In order to aid in moving endless means 8 throughout its path of working operation, a pair of rolls 11 and 12 are disposed to receive the endless means 8 at the upper portions of the loops 8*a* and are driven by means 11*a* such as a chain which is trained about idler sprockets 11*b* and 12*b* and which is driven by a motor not shown but which is coupled to driving sprocket 11*c*. Chain 11*a* cooperates with idler sprocket 12*c*.

For the purpose of regulating the tension of the belts 9 and 10, suitable tensioning means is provided in the form of arm 13 pivotally mounted at 14 and to which a crank arm 15 is secured. Fluid motor 16 controls piston rod 17 and in turn regulates the position of arm 13. In this manner the tension of endless means 8 is controlled because loops 8*a* thereof are disposed about rollers mounted on rod 13*a*.

Heat is supplied to the interior of housing 2 by a conventional heat exchanger designated by the numeral 18. Steam or other heating medium is supplied to heat exchanger 18 by suitable means such as conduit 19 and branch conduits 20. The steam inlet is designated by the numeral 21 and can be supplied with any conventional source in known manner. Used steam is discharged from heat exchanger 18 through discharge conduit 22.

For the purpose of thoroughly agitating the air within housing 2 so as to insure that heat from heat exchanger 18 thoroughly permeates the entire interior within the housing 2, a conventional fan such as that schematically designated by the numeral 23 is mounted within housing 2 and driven by suitable conventional means such as the motor mechanism schematically designated at 24. As shown in the drawing, the conveyor means 8 comprises a pair of endless belts as explained. From FIG. 1 it is apparent that the inner belt 10 proceeds from the tension roller 11 downwardly about the skewed roller 25 and thence about the skewed roller 26 and back to the roller 27 which is positively driven and which constitutes a portion of the infeed mechanism generally designated by the numeral 1.

It will be understood from FIG. 3 that the skewed arrangement is necessary in order to return the belts 10 from the outlet area 3 of the apparatus transversely and diagonally across the apparatus to the entry portion generally designated by the numeral 1.

The outer belt 9 is fed upwardly and over the housing 2 about rollers 28 and upwardly to skewed roller 29 across and above the housing 2 to the skewed roller 30. The belt 9 then proceeds about the roller 31 to the infeed portion generally designated by the numeral 1 and more specifically underneath the roller 32 thereof.

Thus it will be seen that one of the belts such as the inner belt 10 is arranged so that its return reach extends in diagonal fashion underneath the apparatus while the outer belt 9 is arranged so that its return reach extends upwardly and above the apparatus from the outlet part of the apparatus to the infeed part thereof. Of course, the term working portion of the endless means is deemed to designate the portion of each belt which is disposed within the housing 2 and in engagement with the rotatably mounted support elements 6 at any time.

By the invention the articles to be treated not only are securely gripped between the belts 9 and 10 and hence are positively transported throughout the housing 10 during the treating period, the spiral relationship between the conveyor belts 9 and 10 and the support elements 6 affords a significant additional period of time during which heat may be applied in a relatively small space so that an efficient and compact apparatus for treating the articles is provided.

While the apparatus of this invention is particularly well adapted for heat treating articles such as paperboard containers, it is not limited to such use and may be employed for other purposes such as heat treating or drying a continuous web of paper or the like. In such a case it may be desirable to eliminate the infeed and outfeed mechanisms and possibly the belts as well.

The embodiments of the invention in which an exclusive property or privilege is claimed are defined as follows:

1. Article handling and treating apparatus comprising a pair of parallel, coaxial, spaced apart complementary base plates, a plurality of elongated conveyor support elements having their ends mounted on said base plates in spaced relation to the axes thereof, said support elements being skewed at an angle to the common axis of said base plates, and endless means disposed about said support elements and forming more than one spiral turn thereabout.

2. Apparatus according to claim 1 wherein said endless means comprises a pair of belts in flat coincidental relation to each other and arranged to receive therebetween articles to be treated.

3. Apparatus according to claim 1 wherein tension roller means is disposed adjacent some of said support elements and wherein said endless means is trained thereabout.

4. Apparatus according to claim 3 wherein force applying means is arranged to impart movement to said tension means relative to said support elements thereby to vary the tension of said endless means.

5. Apparatus according to claim 1 wherein said plates and said support elements are disposed within a housing and wherein heating and air circulating means are disposed therein, the endless means having a working portion in engagement with said support elements and a return portion disposed outside said housing.

6. Apparatus according to claim 5 wherein said housing is provided with an article inlet and an article outlet and wherein the return portion of said endless means extends from the article outlet to the article inlet.

7. Apparatus according to claim 2 wherein the return portion of one of said belts is remote from the return portion of the other of said belts and at least a portion of said housing being interposed therebetween.

8. Apparatus according to claim 2 wherein the outer one of said belts is arranged so that its return portion extends above said housing and wherein the inner one of said belts is arranged so that its return portion extends underneath said housing.

References Cited

UNITED STATES PATENTS 3,084,448 4/1963 Dungler ---------- 34—162 XR
3,101,898 8/1963 Mader ------------ 263—8 XR JOHN J. CAMBY, Primary Examiner U.S. Cl. X.R.

34—162